(12) United States Patent
Whynall (10) Patent No.: US 11,193,514 B2
(45) Date of Patent: Dec. 7, 2021

(54) FLUID FLOW RESISTOR

(71) Applicant: The Lee Company, Westbrook, CT (US)

(72) Inventor: Scott M. Whynall, Madison, CT (US)

(73) Assignee: THE LEE COMPANY, Westbrook, CT (US)

( * ) Notice: Subject to any disclaimer, the term of this patent is extended or adjusted under 35 U.S.C. 154(b) by 107 days.

(21) Appl. No.: 16/559,790

(22) Filed: Sep. 4, 2019

(65) Prior Publication Data
US 2020/0080576 A1  Mar. 12, 2020

Related U.S. Application Data

(60) Provisional application No. 62/728,945, filed on Sep. 10, 2018.

(51) Int. Cl.
F15D 1/02  (2006.01)

(52) U.S. Cl.
CPC .................................... *F15D 1/025* (2013.01)

(58) Field of Classification Search
CPC ................................ F15D 1/025; F22B 37/74
USPC .......................................................... 138/42
See application file for complete search history.

(56) References Cited

U.S. PATENT DOCUMENTS

| | | | | |
|---|---|---|---|---|
| 3,323,550 A | * | 6/1967 | Lee, II | F15C 1/16 138/39 |
| 5,489,153 A | * | 2/1996 | Berner | B01F 5/061 366/337 |
| 5,505,229 A | * | 4/1996 | Lee, II | F15D 1/00 138/40 |
| 6,015,229 A | * | 1/2000 | Cormack | B01F 5/0065 366/336 |
| 6,701,957 B2 | * | 3/2004 | McCarty | F16K 47/04 137/625.3 |
| 7,520,661 B1 | * | 4/2009 | Lawson | B01F 5/0604 138/42 |
| 7,998,435 B2 | * | 8/2011 | Reed | B01L 3/563 422/507 |
| 8,863,776 B2 | * | 10/2014 | Grace | F16K 3/24 137/625.3 |
| 9,772,003 B2 | * | 9/2017 | Ueki | F16F 13/107 |
| 9,939,038 B2 | * | 4/2018 | Ueki | B60K 5/1208 |
| 2007/0028977 A1 | * | 2/2007 | Goulet | F15D 1/0015 137/809 |

(Continued)

*Primary Examiner* — Craig M Schneider
*Assistant Examiner* — David R Deal
(74) *Attorney, Agent, or Firm* — Cantor Colburn LLP (57) ABSTRACT

A fluid flow resistor includes: a body having entry and exit fluid flow ports, and an internal fluid flow path fluidly extending between the entry and exit fluid flow ports; the internal fluid flow path having a first spiral fluid flow path in a first spiral direction, and a second spiral fluid flow path in a second spiral direction opposite the first spiral direction; each of the first spiral flow path and the second spiral flow path having a plurality of discrete flow chambers fluidly connected in series via interconnecting fluid flow restriction passages; the first and second spiral flow paths having a connecting fluid flow path therebetween; the fluid flow resistor being configured to resistively permit fluid flow from the entry fluid flow port to the exit fluid flow port via the first spiral flow path, the connecting fluid flow path, and the second spiral flow path, in succession.

35 Claims, 8 Drawing Sheets (56) References Cited

U.S. PATENT DOCUMENTS

2010/0300542 A1\* 12/2010 Haines .................... F16K 47/08
                                                    137/1
2016/0131219 A1\*  5/2016 Ueki ....................... F16F 13/08
                                                    267/140.13

\* cited by examiner

FLUID FLOW RESISTOR

CROSS REFERENCE TO RELATED APPLICATIONS

This application claims the benefit of U.S. Provisional Application Ser. No. 62/728,945, filed Sep. 10, 2018, which is incorporated herein by reference in its entirety.

BACKGROUND OF THE INVENTION

The present disclosure relates generally to a fluid flow resistor, and particularly to a fluid flow resistor having two serially connected spiral fluid flow paths in opposing directions to resistively permit fluid flow through the fluid flow resistor.

Existing fluid flow resistors are described in publications such as: U.S. Pat. No. 3,323,550; and, U.S. Pat. No. 5,505,229, both of which are assigned to The Lee Company, CT. A particular type of fluid flow resistor is a visco jet restrictor available from The Lee Company, CT, which consists basically of a set of discs mounted one upon the other to form a complex fluid passage. Fluid enters at the center of one disc and passes through a slot that is tangential to a spin chamber and discharges through a small hole central to the spin chamber into another spin chamber. The process repeats over and over via a convoluted path of spin chambers and connecting tangential slots where the flow passage surfaces of each spin chamber are used many times resulting in a defined fluid flow resistance associated with a given visco jet. While existing fluid flow resistors may be suitable for their intended purpose, the art relating to fluid flow resistors would be advanced with a fluid flow resistance arrangement that permits ease of adjustment of fluid flow resistance within a given fluid flow resistor or within a multi-stage fluid flow resistor, and provides for reduced fabrication complexity.

BRIEF DESCRIPTION OF THE INVENTION

An embodiment includes a fluid flow resistor, having: a body having an entry fluid flow port, an exit fluid flow port, and an internal fluid flow path fluidly extending from the entry fluid flow port to the exit fluid flow port; the internal fluid flow path having a first spiral fluid flow path in a first spiral direction, and a second spiral fluid flow path in a second spiral direction opposite the first spiral direction; each of the first spiral fluid flow path and the second spiral fluid flow path having a plurality of discrete fluid flow chambers fluidly connected in series via interconnecting fluid flow restriction passages; the first spiral fluid flow path and the second spiral fluid flow path having a connecting fluid flow path therebetween; wherein the fluid flow resistor is configured to resistively permit fluid flow from the entry fluid flow port to the exit fluid flow port via the first spiral fluid flow path, the connecting fluid flow path, and the second spiral fluid flow path, in succession.

Another embodiment includes a fluid flow resistor, having: a flat disc-like cylindrical body having an entry fluid flow port and an exit fluid flow port, a plurality of orifices therein extending axially through the body and in fluid communication with the entry fluid flow port and the exit fluid flow port, and a plurality of discrete fluid flow chambers serially connecting the plurality of orifices to form a fluid flow path internal of the body, the combination of the plurality of orifices and the plurality of fluid flow chambers disposed to form a first spiral fluid flow path in a first spiral direction, and a second spiral fluid flow path in a second spiral direction opposite the first spiral direction, the first spiral fluid flow path and the second spiral fluid flow path having a connecting fluid flow path therebetween to provide for spiral reversal of fluid flow within the body.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the claims. Accordingly, the following example embodiments are set forth without any loss of generality to, and without imposing limitations upon, the claimed invention.

An embodiment, as shown and described by the various figures and accompanying text, provides a fluid flow resistor configured for and suitable for use as a single stage or a multi-stage fluid flow resistor, which has two spiral fluid flow paths that are 180-degrees offset from each other and are connected via a connecting fluid flow path, such that in general (further details described herein below) fluid flow follows a first spiral direction, passes through the connecting fluid flow path, and then follows a second spiral direction that opposes the first spiral direction. In an embodiment, the first spiral direction is from a center outward toward an outer perimeter of a body of the fluid flow resistor, and the second spiral direction is from the outer perimeter inward toward the center of the body. In another embodiment, the first spiral direction is from the outer perimeter inward toward the center of the body, and the second spiral direction is from the center outward toward the outer perimeter of the body. In each of the two foregoing example embodiments, the first and second spiral directions are connected or shorted via the connecting fluid flow path. While embodiments described herein depict a cylindrical body as an example body for the fluid flow resistor, it will be appreciated that the disclosed invention is also applicable to other body shapes that can support two opposing spiral fluid flow paths as herein disclosed.

Figure 1:
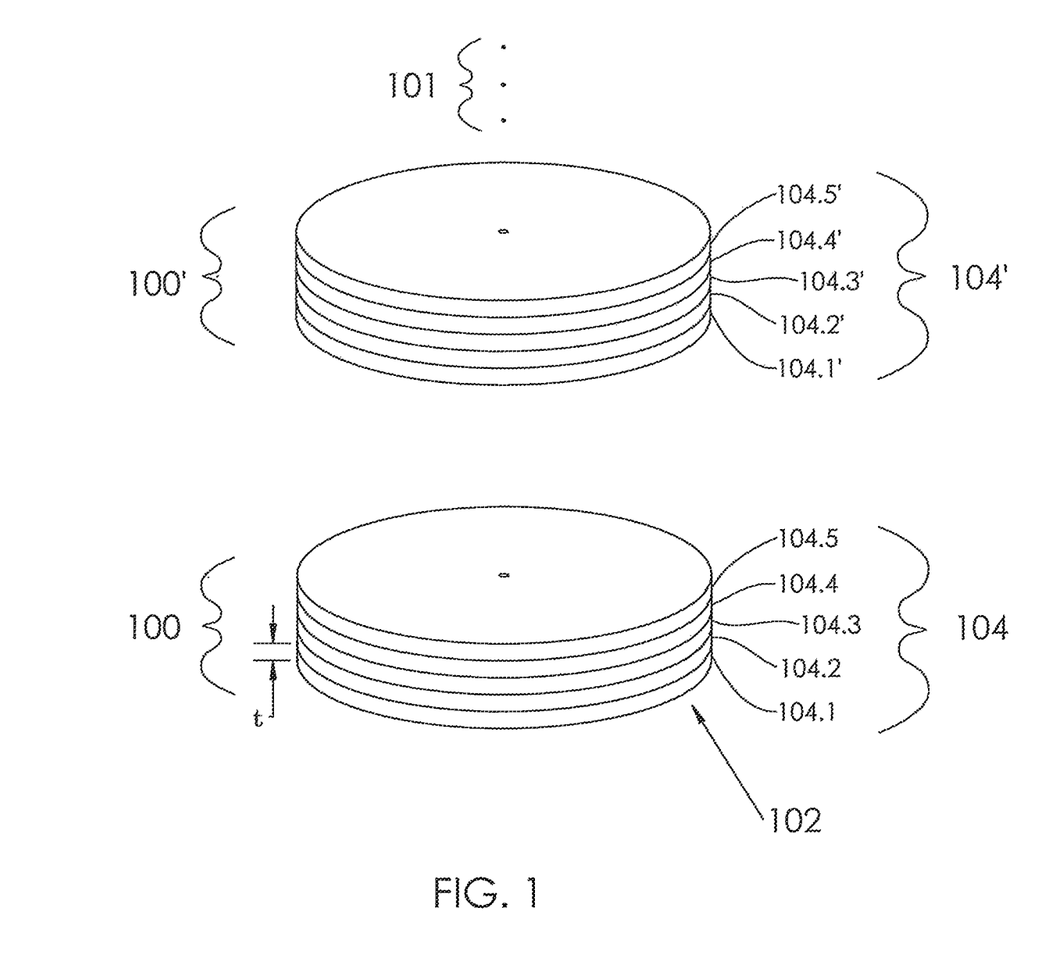
FIG. 1 depicts an example fluid flow resistor having one or multiple stages, in accordance with an embodiment.

Reference is now made to FIGS. 1, 2A, 2B, 2C, 2D, 2E, 3A, and 3B collectively for a general overview of an embodiment. FIG. 1 depicts an example embodiment of a fluid flow resistor 100 having a cylindrical body 102 composed of a plurality of axially arranged fluid flow zones 104.1 (first zone), 104.2 (second zone), 104.3 (third zone), 104.4 (fourth zone), and 104.5 (fifth zone), collectively referred to by reference numeral 104. In an embodiment, the first 104.1, second 104.2, third 104.3, fourth 104.4, and fifth 104.5 zones are provided by discrete layers with defined through openings therein to form entry and exit fluid flow ports with an internal fluid flow path therebetween, which will be described in further detail below. Whether the body 102 is formed of zones or layers, the plurality of axially arranged zones or layers are disposed relative to each other with a fluid tight seal between each adjacent zone or layer that provides the entry fluid flow port, the exit fluid flow port, and the internal fluid flow path therebetween. In an embodiment, the fluid tight seal includes one or more of: an hermetic seal; a fusion bond; a gold layer bond; a brazed bond; or, an adhesive bond. In an embodiment where the body is formed of a plurality of layers, the layers may be flat discs that collectively form the body as a cylindrical body.

FIGS. 2A, 2B, 2C, 2D, and 2E, depict top down views of the plurality of layers, first through fifth, which for convenience are herein referred to as a first layer 104.1, a second layer 104.2, a third layer 104.3, a fourth layer 104.4, and a fifth layer 104.5, respectively, where the second layer 104.2 is disposed on top of the first layer 104.1, the third layer 104.3 is disposed on top of the second layer 104.2, the fourth layer 104.4 is disposed on top of the third layer 104.3, and the fifth layer 104.5 is disposed on top of the fourth layer 104.4, with all five layers being arranged in a clocked arrangement where notches 106.1, 106.2, 106.3 106.4, and 106.5 are aligned with each other. As a side note, it will be appreciated that said notches 106.1-106.5 may be omitted in a commercial embodiment of the fluid flow resistor 100 as manufacturing control techniques may be utilized to properly align the layers 104.1-104.5 in the desired manner. In an embodiment, the first 104.1 and fifth 104.5 layers depicted in FIGS. 2A and 2E, respectively, are identical to each other in that they are identically configured with a single through orifice 110.1 and 110.5, respectfully, disposed in the center of the circular layer, where orifice 110.1 may serve as an entry fluid flow port 110.1, and orifice 110.5 may serve as an exit fluid flow port 110.5. Additionally, in an embodiment the second 104.2 and fourth 104.4 layers depicted in FIGS. 2B and 2D, respectively, are identical to each other in that they are identically configured, but with a 180-degree clocked rotational offset therebetween, which can be seen if the second layer 104.2 is rotated so that the notch 108.2 of the second layer 104.2 is aligned with the notch 106.4 of the fourth layer 104.4, or alternatively if the fourth layer 104.4 is rotated so that the notch 108.4 of the fourth layer 104.4 is aligned with the notch 106.2 of the second layer 104.2. Such use of common layers that are either identical with respect to each other, or identical with respect to each other but with a clocked 180-degree offset therebetween, provides for simplified manufacturing and inventory stocking. In an embodiment, the third layer 104.3 depicted in FIG. 2C has a first spiral arrangement 112 of through orifices 114, and a second spiral arrangement 116 of through orifices 118, with a shorting path or connecting fluid flow path 120 therebetween. In an embodiment, each of the through orifices 114, 118 have a diameter that is equal to or greater than a thickness of the third layer 104.3. In an embodiment, the third layer 104.3 has a thickness that is greater than a thickness of one or more of the first layer 104.1, the second layer 104.2, the fourth layer 104.4, or the fifth layer 104.5, which may be useful in supporting a high pressure drop across the third layer 104.3 between the entry fluid flow port 110.1 and the exit fluid flow port 110.5. In an embodiment, the plurality of through orifices 114 each have a diameter that is equal to a diameter of a corresponding one of the plurality of through orifices 118. In another embodiment, the plurality of through orifices 114 each have a diameter that is different from a diameter of a corresponding one of the plurality of through orifices 118. By utilizing the same or different diameters of through orifices, different fluid flow resistances may be achieved.

Figure 2A:
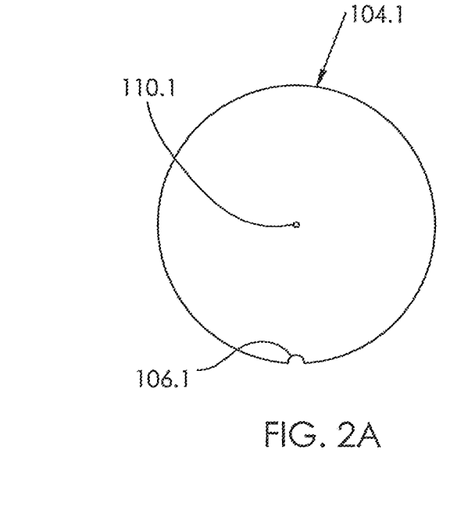
FIGS. 2A, 2B, 2C, 2D, and 2E, depict example first, second, third, fourth, and fifth, fluid flow zones, respectively, of a single stage fluid flow resistor that fluidly cooperate with each other, in accordance with an embodiment.
Figures 2B, 2C:
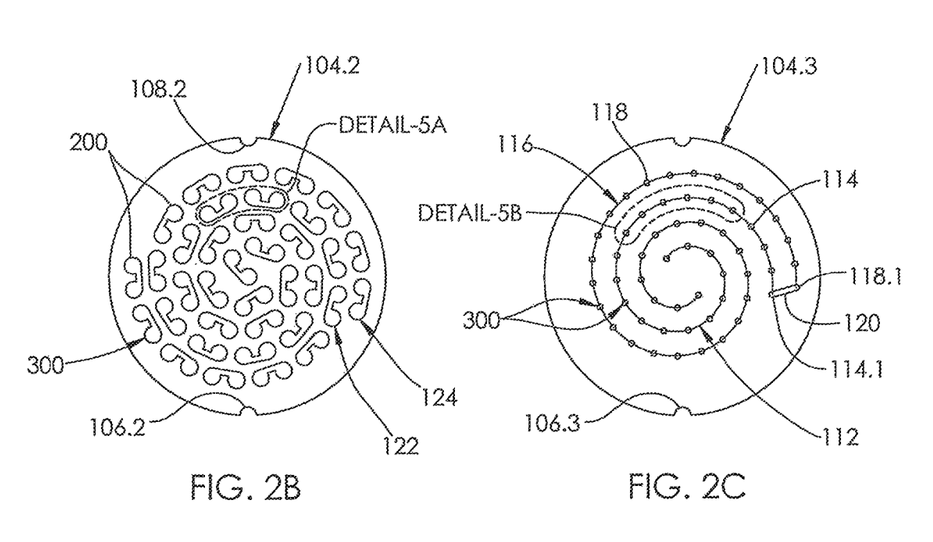
Figure 2D:
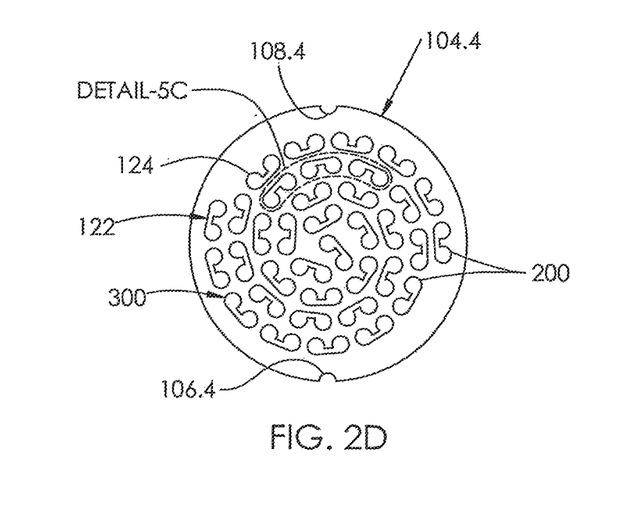
Figure 2E:
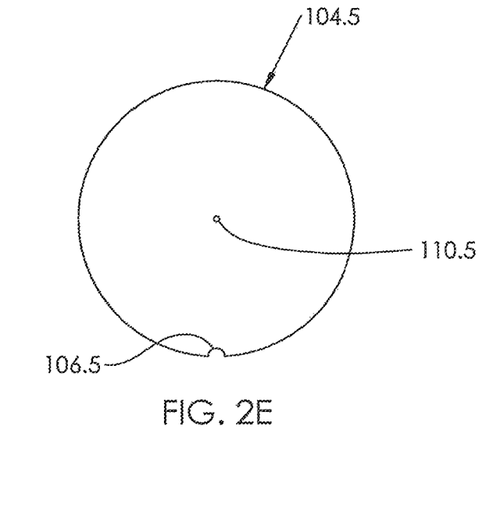
Figure 2F:
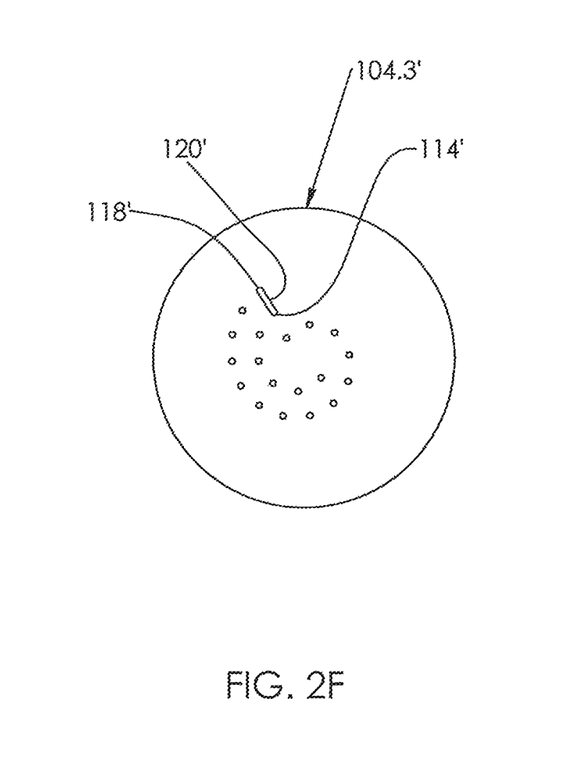
FIGS. 2F, 2G, and 2H, depict alternate examples of the third fluid flow zone of FIG. 2C, in accordance with an embodiment.
Figure 2G:
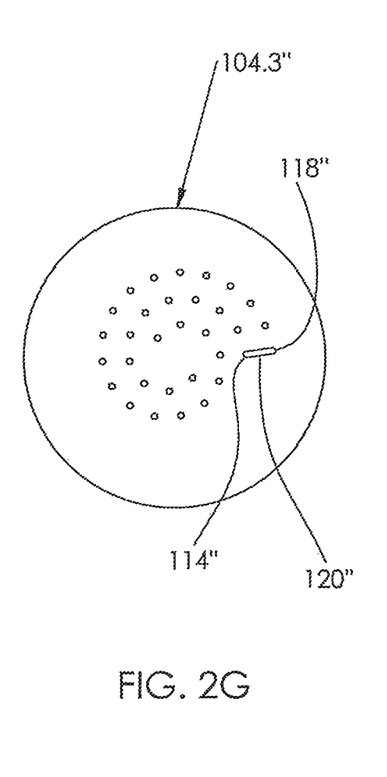
Figure 2H:
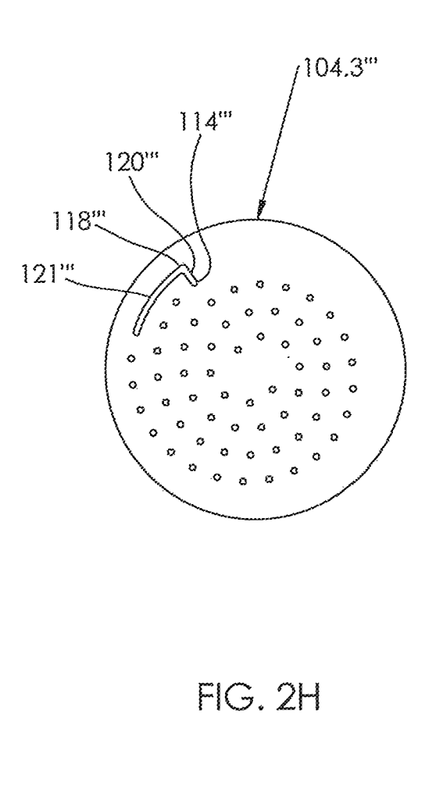
Figure 4A:
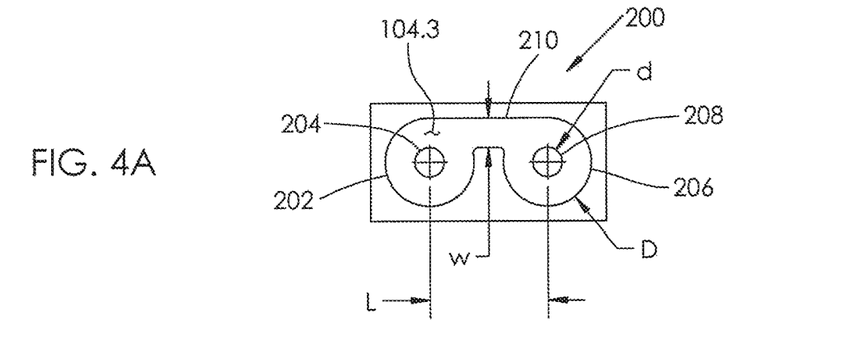
FIGS. 4A, 4B, 4C, and 4D, depict alternative examples of fluid flow chambers for the second and fourth fluid zones, in accordance with an embodiment.

As depicted in FIGS. 2B, 2C, and 2D, the second 104.2, third 104.3, and fourth 104.4 layers include first 122 and second 124 spiral arrangements of fluid flow paths composed of a plurality of discrete fluid flow chambers 200 having a handle-like geometry cut through the respective second 104.2 and fourth 104.4 layers (see also the first and second spiral arrangements 112, 116 depicted via spiral lines in FIG. 2C), which is best seen with reference now to FIG. 4A (FIG. 4A depicts a fluid flow chamber 200 formed in the second 104.2 and fourth 104.4 layers, and entrance 204 and exit 208 orifices in orifice plate 104.3), where each fluid flow chamber 200 has an enlarged generally cylindrical entrance chamber 202, enlarged relative to a corresponding entrance orifice 204 disposed in the third layer 104.3 (see the spiral arrangements 112, 116 of through orifices 114 and 118 in FIG. 2C for example), in fluid communication with the corresponding entrance orifice 204 along an axis of the corresponding cylindrical entrance chamber 202, an enlarged generally cylindrical exit chamber 206, enlarged relative to a corresponding exit orifice 208 disposed in the third layer 104.3 (see the spiral arrangement 112, 116 of through orifices 114 and 118 in FIG. 2C for example), in fluid communication with the corresponding exit orifice 208 along an axis of the corresponding cylindrical exit chamber 206, and a connecting fluid passageway 210 in fluid communication between the corresponding entrance 202 and exit 206 chambers. The orifices 204, 208 and the connecting fluid passageway 210 of each fluid flow chamber 200, each contribute a degree of fluid flow restriction to the overall flow resistance of the fluid flow resistor 100, which will be discussed further below. The fluid flow passage formed from the combination of the two spiral arrangements 122, 124 of the through cut discrete fluid flow chambers 200 in the second 104.2 and fourth 104.4 layers, plus the two spiral arrangements 112, 116 of the through cut orifices in the third layer 104.3, plus the through cut connecting fluid flow path 120 in the third layer 104.3, defines an internal fluid flow path 300 through the fluid flow resistor 100 (which may also be referred to by the discrete features associated with reference numerals 114, 118, 120 and 200), where the path 300 enters at the entry orifice 110.1 of the first layer 104.1, follows the first spiral path 112, 122 of the second, third, and fourth layers 104.2, 104.3, 104.4, out to the perimeter where it crosses over via the connecting fluid flow path 120 to the second spiral path 116, 124 of the second, third, and fourth layers 104.2, 104.3, 104.4, and returns to the center where the fluid exits at exit orifice 110.5 of the fifth 104.5 layer. In an embodiment, the connecting fluid flow path 120 between the first spiral fluid flow path 112 and the second spiral fluid flow path 116 is disposed proximate nearest adjacent through orifices 114.1 and 118.8 of the first and second spiral arrangements 112, 116, however, in general the fluid shorting path (ref num. 120) may be formed by interconnecting any nearest adjacent corresponding through orifices of the first and second spiral arrangements, thereby providing for adjustability in the degree of flow resistance provided by the fluid flow resistor, which can be seen with reference to FIGS. 2F, 2G and 2H depicting three alternative third layers 104.3', 104.3" and 104.3''', respectively, where FIG. 2F depicts a third layer 104.3' having a fluid shorting path 120' interconnecting nearest adjacent through orifices 114', 118' to provide for 18 non-shorted orifices, FIG. 2G depicts a third layer 104.3" having a fluid shorting path 120" interconnecting nearest adjacent through orifices 114", 118" to provide for 30 non-shorted orifices, and FIG. 2H depicts a third layer 104.3''' having a fluid shorting path 120' interconnecting nearest adjacent through orifices 114''', 118''', and with a fluid shorting path extension 121''' to further shorten and fine tune the internal fluid flow path 300. The fluid shorting path extension 121''' may be associated with the outside second spiral arrangement 116 of orifices 118 as depicted in FIG. 2H, or with the inside first spiral arrangement 112 of orifices 114. The third layer 104.3''' of FIG. 2H has 59 non-shorted orifices.

Figure 3A:
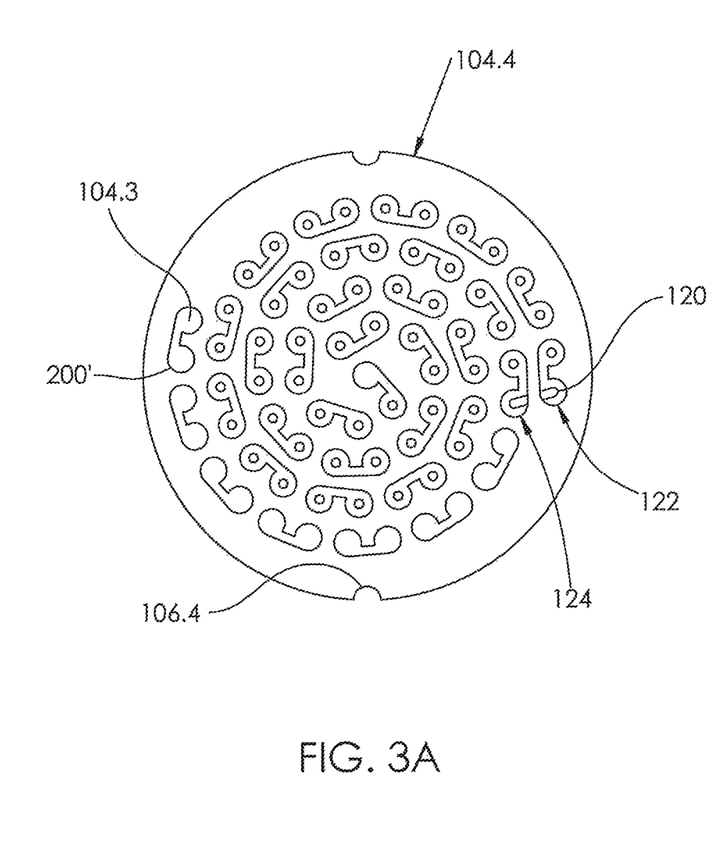
FIG. 3A depicts a top down plan view of the fourth fluid flow zone of FIG. 2D, in accordance with an embodiment.
Figure 3B:
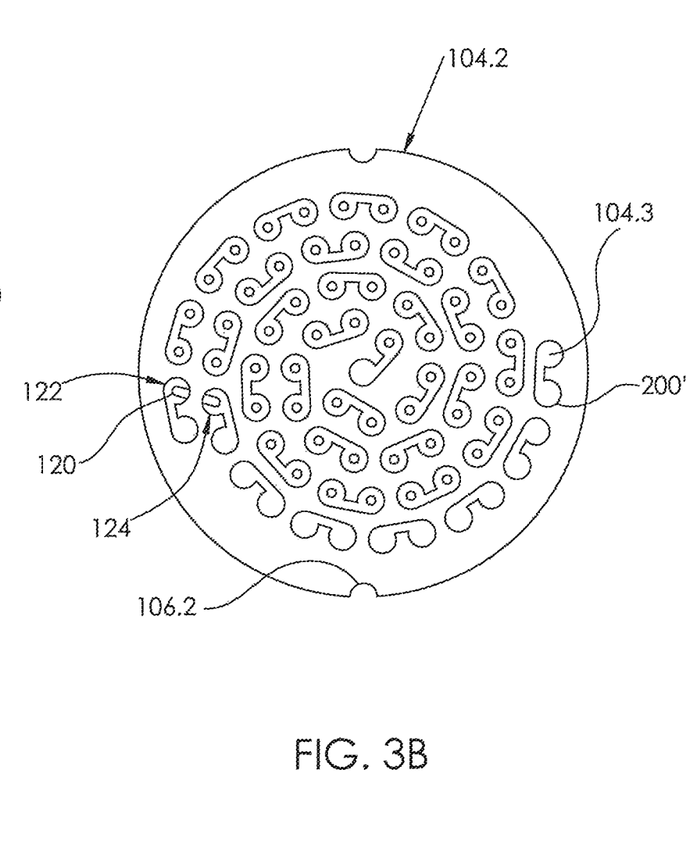
FIG. 3B depicts a bottom up plan view of the second fluid flow zone of FIG. 2B, in accordance with an embodiment.

FIG. 3A depicts a top down view of the fourth layer 104.4 disposed on top of the third layer 104.3 (denoted by ref num. 104.3 that serves to form a blind pocket with respect to chamber 200'), and FIG. 3B depicts a bottom up view of the second layer 104.2 disposed underneath the third layer 104.3 (denoted by ref num. 104.3 that serves to form a blind pocket with respect to chamber 200'). The aforementioned spiral arrangements 122, 124 and fluid shorting path 120 forming at least a portion of the internal fluid flow path 300 are denoted accordingly in FIGS. 3A and 3B.

In an embodiment, each of the aforementioned spiral arrangements 112, 116, 122, 124 has a spiral direction that forms a spiral in accordance with an equation for the spiral of Archimedes. In an embodiment, a first spiral direction, such as spiral arrangements 112 and 122 for example, forms a spiral defined by $(r=a+b\theta)$, and a second spiral direction, such as spiral arrangements 116 and 124 for example, forms a spiral defined by $(r=2a+b\theta)$, where a and b are user defined constants, r is the radius at any given point on the corresponding spiral from a center of the body, and $\theta$ is the degree of rotation of the corresponding radius. By utilizing the spiral equations as herein disclosed, two 180-degree offsetting spirals can be formed with a turn spacing defined by b/2, and with each set of orifices 114, 118 being equidistantly spaced apart a defined distance "s" (see FIG. 5B for example), where "s" is defined by the desired chamber length L as depicted in FIG. 4A. It will be appreciated that the distance "s" being a uniform distance is a matter of design choice, and that an alternative embodiment may employ non-equidistantly spaced apart orifices 114, 118 as long as a continuous fluid flow path 300 is provided.

Figures 5A, 5B:
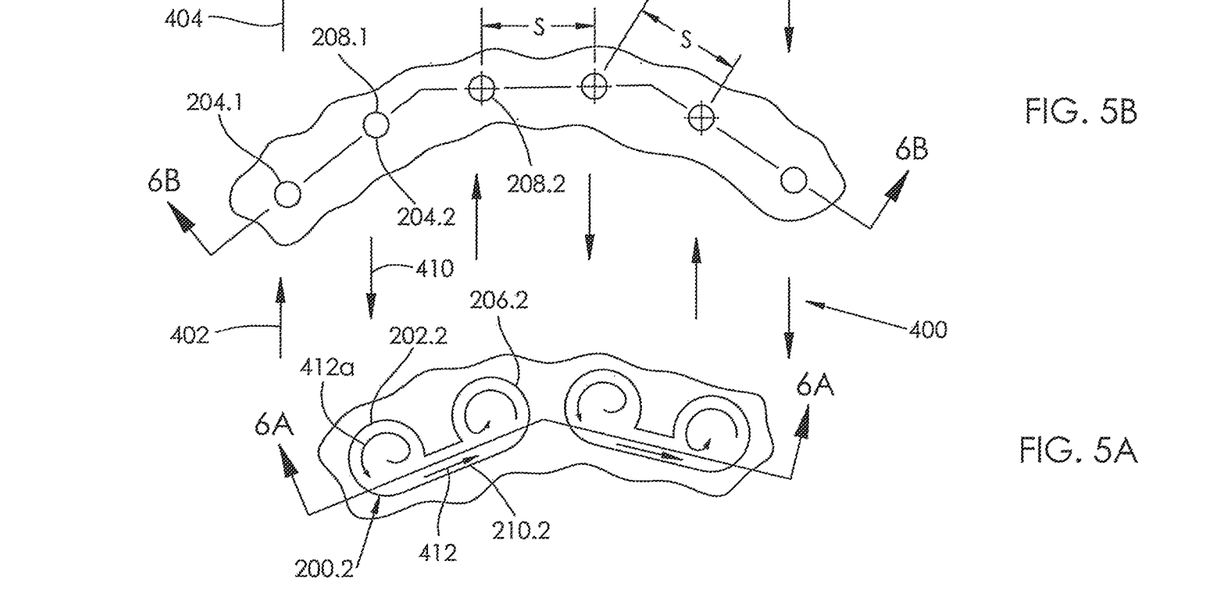
FIGS. 5A, 5B, and 5C, depict partial disassembled assembly plan views of the second, third, and fourth, fluid zones with fluid flow velocity vectors identified, in accordance with an embodiment.
Figure 5C:
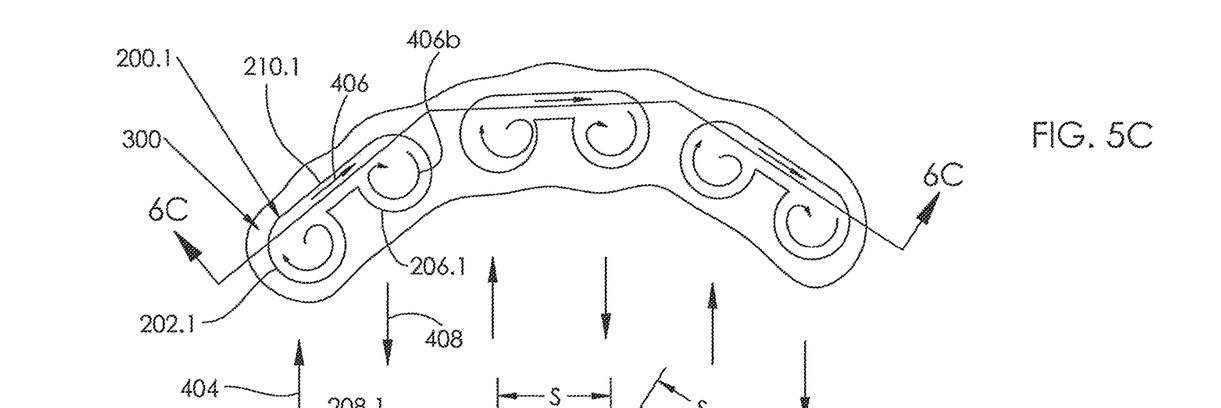
Figure 6A:
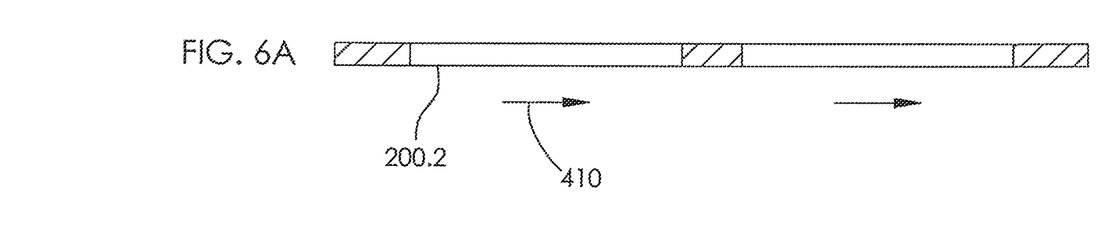
FIGS. 6A, 6B, and 6C, depict partial disassembled assembly cross section elevation views through cut lines 6A-6A, 6B-6B, and 6C-6C, respectively, of FIGS. 5A, 5B, and 5C, respectively, in accordance with an embodiment.
Figure 6B:
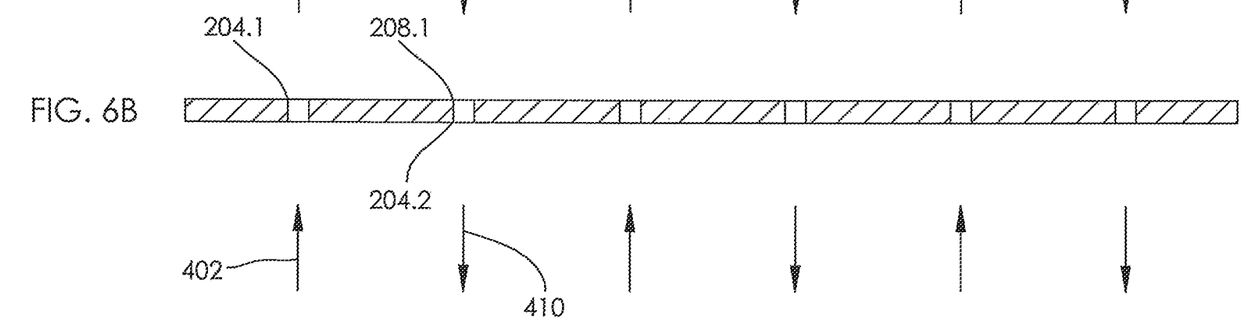
Figure 6C:
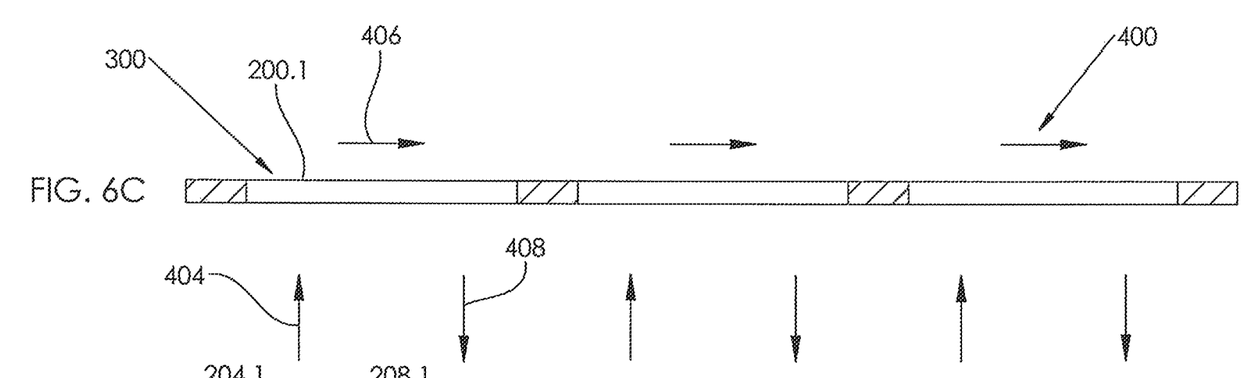

Reference is now made to FIGS. 5A, 5B, 5C, 6A, 6B, and 6C, in combination with one or more aforementioned figures, where FIG. 5A depicts a top down view of a portion of the second layer 104.2 noted as Detail-5A in FIG. 2B, FIG. 5B depicts a top down view of a portion of the third layer 104.3 noted as Detail-5B in FIG. 2C, and FIG. 5C depicts a top down view of a portion of the fourth layer 104.4 noted as Detail-5C in FIG. 2D. FIG. 6A is a cross section side view through section cut line 6A-6A depicted in FIG. 5A, FIG. 6B is a cross section side view through section cut line 6B-6B depicted in FIG. 5B, and FIG. 6C is a cross section side view through section cut line 6C-6C depicted in FIG. 5C. FIGS. 5A, 5B, 5C, 6A, 6B, and 6C, and depicted in a disassembled assembly view to illustrate the associated fluid flow velocity vectors therethrough.

In an embodiment, each chamber 200 is configured to effect reversal of the fluid flow velocity vector in the corresponding exit orifice 208 as compared to the fluid flow velocity vector in the corresponding entrance orifice 204 of a fluid passing through the corresponding chamber 200 of the internal fluid flow path 300. For example, FIGS. 5A-5C and 6A-6C depict a general fluid flow velocity vector 400 that flows within the internal fluid flow path, and where it can be seen that each chamber 200.1, for example, is configured to effect reversal of the fluid flow velocity vector 408 in the corresponding exit orifice 208.1 as compared to the fluid flow velocity vector 404 in the corresponding entrance orifice 204.1 of the fluid passing through the corresponding chamber 200.1 of the internal fluid flow path 300. The same reversal of direction of the fluid flow velocity vectors in subsequent sequential exit and entrance orifices can be seen by way of illustration in FIGS. 5A-5C and 6A-6C. And in the same or another embodiment, an adjacent pair of serially connected chambers 200 includes, for example: a first chamber 200.1 having a successive arrangement of; a first entrance orifice 204.1, a first generally cylindrical entrance chamber 202.1, a first connecting fluid passageway 210.1, a first generally cylindrical exit chamber 206.1, and a first exit orifice 208.1, and; a second sequentially arranged chamber 200.2 having a successive arrangement of; a second entrance orifice 204.2, a second generally cylindrical entrance chamber 202.2, a second connecting fluid passageway 210.2, a second generally cylindrical exit chamber 206.2, and a second exit orifice 208.2; wherein the first exit orifice 208.1 is coincidental with the second entrance orifice 204.2, and the first and second chambers 200.1, 200.2 are configured to effect reversal of the fluid flow velocity vector 412*a* (counter-clockwise rotation) in the second entrance chamber 202.2 as compared to the fluid flow velocity vector 406*b* (clockwise rotation) in the first exit chamber 206.1. The same reversal of rotation of the fluid flow velocity vectors in subsequent sequential entrance and exit chambers can be seen by way of illustration in FIGS. 5A-5C and 6A-6C.

From the foregoing description and as depicted in the foregoing described figures, an embodiment of the fluid flow resistor 100 includes a cylindrical body 102 having an entry fluid flow port 110.1, an exit fluid flow port 110.5, and an internal fluid flow path 300 fluidly extending from the entry fluid flow port 110.1 to the exit fluid flow port 110.5; the internal fluid flow path 300 having a first spiral fluid flow path 122 in a first spiral direction (clockwise from a center of the cylindrical body toward an outer perimeter), and a second spiral fluid flow path 124 in a second spiral direction (counter-clockwise from the outer perimeter of the cylindrical body toward the center) opposite the first spiral direction; each of the first spiral fluid flow path 122 and the second spiral fluid flow path 124 having a plurality of discrete fluid flow chambers 200 fluidly connected in series via interconnecting fluid flow restriction passages 114, 118 (also herein referred to as entrance and exit orifices 204, 208 in relation to a corresponding chamber 200); the first spiral fluid flow path 122 and the second spiral fluid flow path 124 having a connecting fluid flow path 120 therebetween; wherein the fluid flow resistor 100 is configured to resistively permit fluid flow from the entry fluid flow port 110.1 to the exit fluid flow port 110.5 via the first spiral fluid flow path 122 with interconnecting fluid flow restriction passages 114, the connecting fluid flow path 120, and the second spiral fluid flow path 124 with interconnecting fluid flow restriction passages 118, in succession. In an embodiment, each of the discrete fluid flow chambers 200 of the second layer 104.2 and the fourth layer 104.4 are identically configured.

Figure 4B:
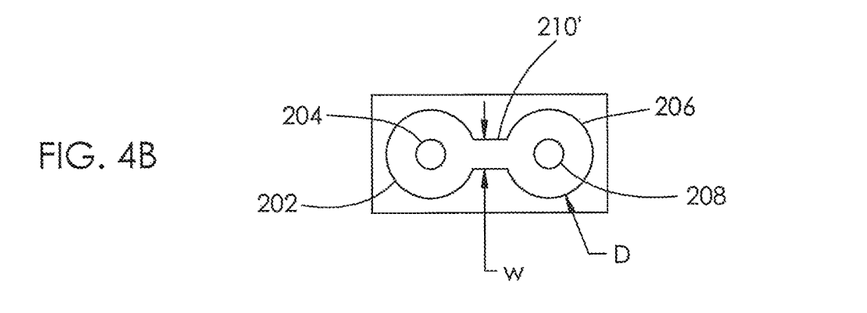
Figure 4C:
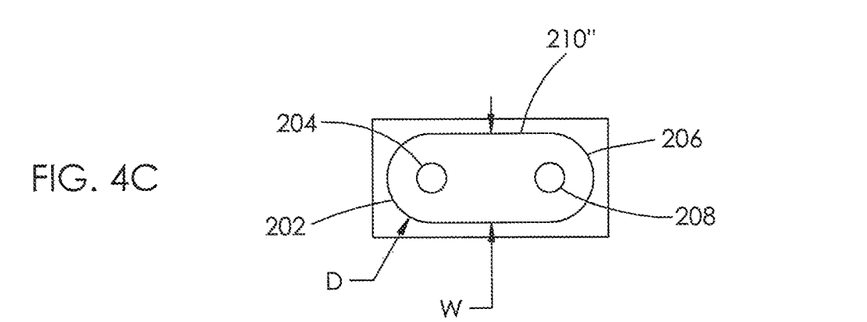
Figure 4D:
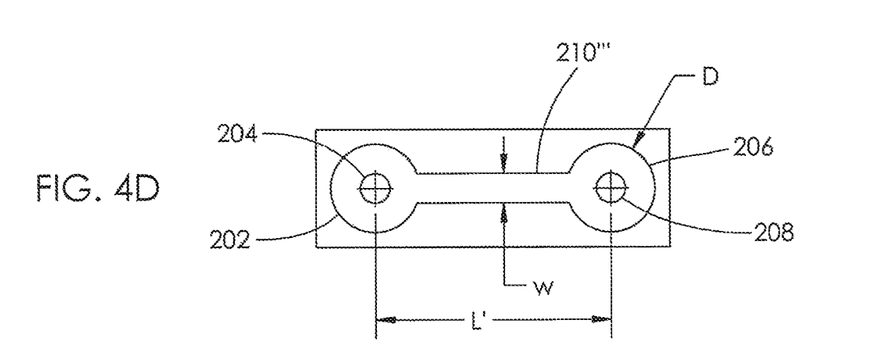

With reference now back to FIG. 4A in combination with FIGS. 4B and 4C, an embodiment includes an arrangement where the connecting fluid passageway 210 in fluid communication between the corresponding entrance and exit chambers 202, 206 has a width "w" that is smaller than a diameter "D" of the corresponding entrance and exit chambers 202, 206, and is in a direction generally tangent to the corresponding cylindrical entrance and exit chambers 202, 206, as depicted in FIG. 4A. In an embodiment, the width "w" of the connecting fluid passageway 210 is equal to the diameter "d" of the entrance and exit orifices 204, 208, which serves to provide three fluid flow restrictions per fluid flow chamber 200, a first restriction via the entrance orifice 204, and second restriction via the connecting fluid passageway 210, and a third restriction via the exit orifice 208. In an embodiment, the length "L" between the entrance and exit orifices 204, 208 of a given fluid flow chamber 200 is selected such that the first, second, and third fluid flow restrictions, are substantially equal. It will be appreciated, then, that a change in plate thickness of the second and/or fourth layers 104.2, 104.4 will affect the degree of restriction provided by the connecting fluid passageway 210, which may be by intentional design, or by tolerance variances. As disclosed herein, a convenient way to fine tune the overall fluid flow restriction of the fluid flow resistor 100 to accommodate tolerance variations or alternative designs is to adjust the length of the fluid flow spiral paths by adding or subtracting restrictions via strategic placement of the connecting fluid flow path 120. Alternatively, the connecting fluid passageway 210' in fluid communication between the corresponding entrance and exit chambers 202, 206 has a width "w" that is smaller than a diameter "D" of the corresponding entrance and exit chambers 202, 206, and is in a direction generally linearly aligned with the corresponding entrance and exit orifices 204, 208, as depicted in FIG. 4B. Further alternatively, the connecting fluid passageway 210" in fluid communication between the corresponding entrance and exit chambers 202, 206 has a width "W" that is substantially equal to a diameter "D" of the corresponding entrance and exit chambers 202, 206, and is in a direction generally linearly aligned with the corresponding entrance and exit orifices 204, 208, as depicted in FIG. 4C. It will be appreciated that a connecting fluid passageway 210" having a width "W" that is substantially equal to diameter "D" and that is substantially greater than width "w" will comparatively result in a substantially lower degree of fluid flow restriction, and which may be considered negligible as compared to the fluid flow restriction of the entrance and exit orifices 204, 208. As such, a calculation of the overall fluid flow resistance should take into account the degree of restriction provided by each discrete fluid flow restriction. Yet further alternatively, the connecting fluid passageway 210''' in fluid communication between the corresponding entrance and exit chambers 202, 206 has a length defined by L' between the entrance and exit orifices 204, 208, where L' is greater the L, as depicted in FIG. 4D, which would provide for further adjustment of the overall fluid flow resistance of the fluid flow resistor 100.

With reference now back to FIGS. 1, 2A, 2B, 2C, 2D and 2E, an embodiment of the fluid flow resistor 100, as described herein above, may be composed of a plurality of layers that form the plurality of fluid flow zones 104.1, 104.2, 104.3, 104.4, and 104.5. However, it will be appreciated that a scope of the invention is not so limited, as one skilled in the art when presented with the teachings of the subject disclosure will appreciate that: the first zone 104.1 and the second zone 104.2 may be provided by a single monolithic layer (104.1+104.2); the second zone 104.2 and the third zone 104.3 may be provided by a single monolithic layer (104.2+104.3); the third zone 104.3 and the fourth zone 104.4 may be provided by a single monolithic layer (104.3+104.4); or the fourth zone 104.4 and the fifth zone 104.5 may be provided by a single monolithic layer (104.4+104.5), where each single monolithic may be formed by a casting, or by any other means suitable for a purpose disclosed herein, such as laser milling for example. Additionally, a plurality of single monolithics may be combined in a single fluid flow resistor 100, such as monolithic 104.1+104.2 and monolithic 104.4+104.5, for example, with the third zone or layer 104.3 being separate, which may be useful where the third layer 104.3 may be used to adjust the fluid flow resistance by using different shorting paths 120, 120', 120", 120''', and 121''' as described herein above, for example. As used herein, the term monolithic means a structure integrally formed from a single material composition.

While an embodiment has been described and illustrated herein having a first spiral flow direction 112, 122 from the center outward toward the outer perimeter of the body 102, and a second spiral flow direction 116, 124 from the outer perimeter inward toward the center of the body 102, which serves well for centrally disposed entry and exit ports 110.1, 110.5 on the first and fifth layers 104.1, 104.5, respectively, it will be appreciated that a scope of the invention is not so limited and that an alternative embodiment may have a first spiral flow direction 116, 124 from an outer perimeter inward toward a center of a body, and a second spiral flow direction 112, 122 is from the center outward toward the outer perimeter of the body. One skilled in the art when presented with the teachings of the subject disclosure will appreciate that a modification of the location of the entry and exit ports 110.1, 110.5 of the first and fifth layers 104.1, 104.5 would achieve the aforementioned alternative embodiment having outward to inward, and then inward to outward, spiral flow directions, without further illustration being necessary.

While an embodiment has been described and illustrated herein having the discrete fluid flow chambers 200 being identically configured, see FIGS. 2B, 2D, 4A, 4B and 4C, for example, it will be appreciated that a scope of the invention is not so limited and that an embodiment may include an arrangement where one or more of the plurality of discrete fluid flow chambers 200 may not identically configured in that one or more chambers 200 may have a longer fluid flow path 210, 210', 210" between the corresponding interconnecting flow restriction passages 114, 118 or 204, 208 than another one of the plurality of discrete fluid flow chambers 200, without further illustration being necessary.

Reference is now made back to FIG. 1, where an embodiment of a fluid flow resistor as herein disclosed may include an arrangement where a first fluid flow resistor 100, herein referred to as a first stage, is serially connected in fluid flow connection with at least a second fluid flow resistor 100', herein referred to as a second stage, where more than two stages of a multi-stage fluid flow resistor could be employed, as denoted by the ellipses 101 in FIG. 1. In an embodiment of a multi-stage fluid flow resistor, it will be appreciated that since plate 104.5 of the bottom stack 104, and plate 104.1' of the top adjacent stack 104', are the same, one of them may be eliminated, which would not only reduce the overall stack height, but would also eliminate potential alignment issues between the adjacent stacks. In an embodiment, the entrance and exit orifices 110.1, 110.5 or the first and second pluralities of through orifices 114, 118 of the first stage 100 each have a first common diameter, and the entrance and exit orifices 110.1, 110.5 or the first and second pluralities of through orifices 114, 118 of the second stage 100' have a second common diameter. In an embodiment, the second common diameter is equal to the first common diameter. In another embodiment, the second common diameter is not equal to the first common diameter. In an embodiment, the first stage 100 has a corresponding first internal fluid flow path 300 with a corresponding first connecting fluid flow path 120 between the corresponding first 112, 122 and second 116, 124 spiral fluid flow paths, the second stage 100' has a corresponding second internal fluid flow path 300 with a corresponding second connecting fluid flow path 120' between the corresponding first 112, 122 and second 116, 124 spiral fluid flow paths, wherein the second internal fluid flow path 300 is shorter than the first internal fluid flow path 300 based at least in part on the placement of the second connecting fluid flow path 120' in the second internal fluid flow path 300 relative to the placement of the first connecting fluid flow path 120 in the first internal fluid flow path 300, thereby providing for fine tune adjustment of the flow resistance of the multi-stage fluid flow resistor 100, 100', particularly when the multi-stage fluid flow resistor has more than two stages. Of course, it will be appreciated that each stage of a multi-stage fluid flow resistor 100, 100', 101 may have the same length of internal fluid flow path 300 by selection of just one connecting fluid flow path 120, 120', 120'', or 120''' plus 121''', for example, for a given stage 100, 100', 101. In an embodiment of a multi-stage fluid flow resistor 100, 100', 101, it will be appreciated that only one of layer 110.1 and layer 110.5 may be used between adjacent stages 100, 101'.

Further to the foregoing description and illustration with reference to the accompanying figures, alternative descriptions of an embodiment disclosed herein include at least the following arrangements.

Arrangement-1: A fluid flow resistor 100, having: a flat disc-like cylindrical body 102 having an entry fluid flow port 110.1 and an exit fluid flow port 110.5, a plurality of orifices 114, 118 therein extending axially through the body 102 and in fluid communication with the entry fluid flow port 110.1 and the exit fluid flow port 110.5, and a plurality of discrete fluid flow chambers 200 serially connecting the plurality of orifices 114, 118 to form a fluid flow path 300 internal of the body 102, the combination of the plurality of orifices 114, 118 and the plurality of fluid flow chambers 200 disposed to form a first spiral fluid flow path 112, 122 in a first spiral direction, and a second spiral fluid flow path 116, 124 in a second spiral direction opposite the first spiral direction, the first spiral fluid flow path 112, 122 and the second spiral fluid flow path 116, 124 having a connecting fluid flow path 120 therebetween to provide for spiral reversal of fluid flow within the body 102.

Arrangement-2: The resistor 100 according to Arrangement-1, wherein: the entry fluid flow port 110.1 is disposed on a first portion 104.1 of the body 102; the plurality of fluid flow chambers 200 comprises a first set of fluid flow chambers 200 disposed on a second portion 104.2 of the body 102 adjacent the first portion 104.1; the plurality of orifices 114, 118 are disposed on a third portion 104.3 of the body 102 adjacent the second portion 104.2; the plurality of fluid flow chambers 200 further comprises a second set of fluid flow chambers 200 disposed on a fourth portion 104.4 of the body 102 adjacent the third portion 104.3; the exit fluid flow port 110.5 is disposed on a fifth portion 104.5 of the body 102 adjacent the fourth portion 104.4; the first, second, third, fourth and fifth portions 104.1, 104.2, 104.3, 104.4, 104.5 are disposed relative to each other with a fluid tight seal between each adjacent portion that provides the entry fluid flow port 110.1 and the exit fluid flow port 110.5 with the internal fluid flow path 300 therebetween.

Arrangement-3: The resistor 100 according to Arrangement-2, wherein: the combination of the plurality of axially extending orifices 114, 118 and the plurality of fluid flow chambers 200 are configured to effect reversal of the fluid flow velocity vector 404, 408 from one of the axially extending orifices 204.1 to a serially and sequentially connected another one of the axially extending orifices 208.1.

Arrangement-4: The resistor 100 according to Arrangement-3, wherein: the combination of the first set of fluid flow chambers 200.1, the plurality of axially extending orifices 114, 118, and the second set of fluid flow chambers 200.2 are configured to effect reversal of the fluid flow velocity vector 406b, 412a from one of the fluid flow chambers 200.1, 206.1 of the first set of fluid flow chambers 200.1 to a serially and sequentially connected one of the fluid flow chambers 200.2, 202.2 of the second set of fluid flow chambers 200.2.

Figure 7:
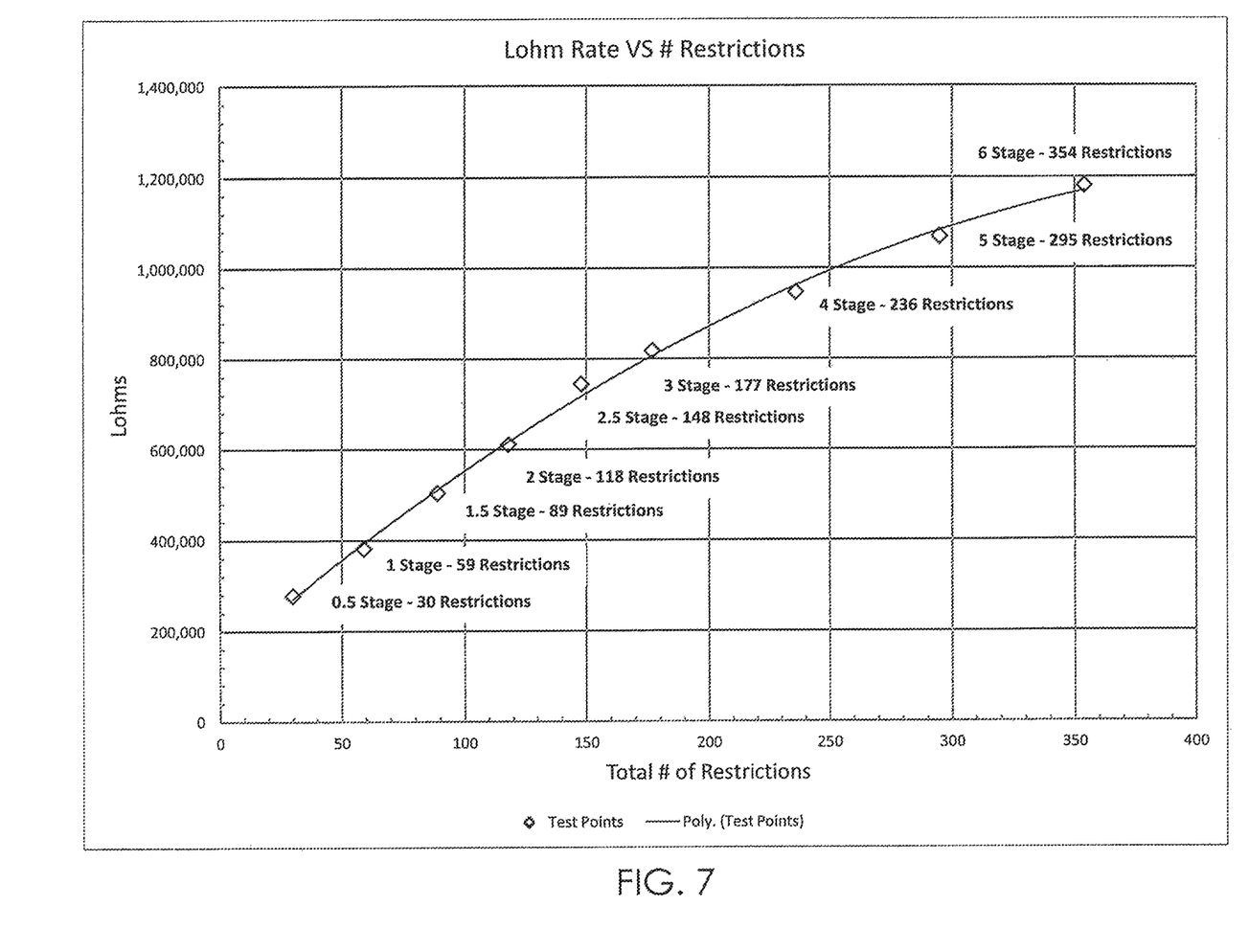
FIG. 7 depicts a chart of Lohm rate versus the number of sequentially arranged orifices over partial or multiple stages of a fluid flow resistor, in accordance with an embodiment.

An embodiment as disclosed herein may have extremely small dimensions while offering clog-free flow restriction of fluid (liquid or gas) that may contain small particles due to wear of moving parts within a fluid flow system. For example, each entry and exit fluid flow port 110.1, 110.5, and each through orifice 114, 118, may have a diameter d equal to about 0.005 inches (see orifices 204, 208 in FIG. 4A for example), with the fluid flow chambers 200 being appropriately sized to provide the desired fluid flow resistance, which will be discussed in connection with FIG. 7, which depicts a chart of Lohm rate versus the number of sequentially arranged orifices and/or discrete restrictions 114, 118, 210 over partial or multiple stages of a fluid flow resistor 100, 100', 101 as herein disclosed, where the term Lohm is defined and discussed in detail in The Lee Company Technical Hydraulic Handbook, Eleventh Edition, 2009, pages M1-M52, which is incorporated herein by reference in its entirety. That said, the value of a Lohm has been selected so that a one Lohm restriction will permit a flow of 100 gallons per minute of water with a pressure drop of 25 psi (pounds per square inch) at a temperature of 80-degrees Fahrenheit. As depicted in FIG. 7, a Lohm rate in excess of 1 million Lohms is possible with an embodiment disclosed herein. As an example, for a single orifice plate, Lohms $L=0.76/d^2$, where d is the orifice diameter in inches. When multiple equally sized orifices and/or restrictions appear in series, such as the spirals already described herein, then $L_T$ is the total Lohm of a series, and $L_T = LN^{0.5}$, where N" is the square root of the number of restrictions in the series. For a single 0.005 inch diameter orifice, L=30,400. If N=18, then the Lohms would be 128,976, the equivalent of a single 0.0024 diameter orifice. Previously mentioned was a 1,000,000 Lohm fluid flow resistor 100, which would be the equivalent of a single 0.00087 inch diameter hole. As can be seen from the foregoing example, use of a fluid flow resistor 100 as disclosed herein has an advantage of providing a desired fluid flow resistance using orifice diameters suitable to pass small particles without clogging, while offering ease of adjustment of the overall fluid flow resistance. In an embodiment, the fluid flow chambers 200 may have cylindrical entrance and exit chambers 202, 206 having a diameter D of about 0.015 inches, and a distance L between entrance and exit orifices 204, 208 of about 0.022 inches for example (see FIG. 4A for example). In an embodiment, each layer 104.1, 104.2, 104.3, 104.4, 104.5, may have a thickness t of about 0.005 inches (see FIG. 1 for example).

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" another element, it can be directly on the other element, or intervening elements may also be present. In contrast, when an element is referred to as being "directly on" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A fluid flow resistor, comprising:
a body comprising an entry fluid flow port, an exit fluid flow port, and an internal fluid flow path fluidly extending from the entry fluid flow port to the exit fluid flow port;
the internal fluid flow path comprising a first spiral fluid flow path in a first spiral direction, and a second spiral fluid flow path in a second spiral direction opposite the first spiral direction;
each of the first spiral fluid flow path and the second spiral fluid flow path comprising a plurality of discrete fluid flow chambers fluidly connected in series via interconnecting fluid flow restriction passages;
the internal fluid flow path further comprising a connecting fluid flow path disposed between the first spiral fluid flow path and the second spiral fluid flow path;
wherein the first spiral fluid flow path extends from the entry fluid flow port to the connecting fluid flow path, and the second spiral fluid flow path extends from the connecting fluid flow path to the exit fluid flow port; and
wherein the fluid flow resistor is configured to resistively permit fluid flow from the entry fluid flow port to the exit fluid flow port via the first spiral fluid flow path, the connecting fluid flow path, and the second spiral fluid flow path, in succession.

2. The resistor of claim 1 wherein:
the interconnecting fluid flow restriction passages are entrance and exit orifices disposed in fluid flow relationship with a corresponding one of the plurality of discrete fluid flow chambers.

3. The resistor of claim 2, wherein:
each chamber of the plurality of fluid flow chambers comprises an enlarged generally cylindrical entrance chamber, enlarged relative to a corresponding entrance orifice, in fluid communication with the corresponding entrance orifice along an axis of a corresponding one of the enlarged generally cylindrical entrance chamber, an enlarged generally cylindrical exit chamber, enlarged relative to a corresponding exit orifice, in fluid communication with the corresponding exit orifice along an axis of a corresponding one of the enlarged generally cylindrical exit chamber, and a connecting fluid passageway in fluid communication between corresponding ones of the enlarged generally cylindrical entrance chamber and the enlarged generally cylindrical exit chamber; and
each chamber is configured to effect reversal of a fluid flow velocity vector in the corresponding exit orifice as compared to a fluid flow velocity vector in the corresponding entrance orifice.

4. The resistor of claim 3, wherein:
the connecting fluid passageway in fluid communication between the corresponding entrance and exit chambers has a width that is smaller than a diameter of the corresponding entrance and exit chambers, and is in a direction generally tangent to the corresponding cylindrical entrance and exit chambers.

5. The resistor of claim 3, wherein:
the connecting fluid passageway in fluid communication between the corresponding entrance and exit chambers has a width that is smaller than a diameter of the corresponding entrance and exit chambers, and is in a direction generally linearly aligned with the corresponding entrance and exit orifices.

6. The resistor of claim 3, wherein:
the connecting fluid passageway in fluid communication between the corresponding entrance and exit chambers has a width that is substantially equal to a diameter of the corresponding entrance and exit chambers, and is in a direction generally linearly aligned with the corresponding entrance and exit orifices.

7. The resistor of claim 3, wherein:
an adjacent pair of serially connected chambers includes:
a first chamber having a successive arrangement of; a first entrance orifice, a first generally cylindrical entrance chamber, a first connecting fluid passageway, a first generally cylindrical exit chamber, and a first exit orifice, and;
a second chamber having a successive arrangement of; a second entrance orifice, a second generally cylindrical entrance chamber, a second connecting fluid passageway, a second generally cylindrical exit chamber, and a second exit orifice;

wherein the first exit orifice is coincidental with the second entrance orifice to form interconnecting exit and entrance orifices, and the first and second chambers are configured to effect reversal of a fluid flow velocity vector in the second entrance chamber as compared to a fluid flow velocity vector in the first exit chamber.

8. The resistor of claim 7, wherein:
the body has a central axis that extends axially from a first end of the body at which the entry fluid flow port is disposed toward a second end of the body at which the exit fluid flow port is disposed;
the body further comprises a plurality of axially arranged zones that are arranged relative to each other so as to provide the entry fluid flow port and the exit fluid flow port with the internal fluid flow path therebetween;
the plurality of axially arranged zones comprise a first zone, a second zone, a third zone, a fourth zone, and a fifth zone;
the first zone provides the entry fluid flow port;
the fifth zone provides the exit fluid flow port; and
the second, third and fourth zones in combination provide the internal fluid flow path.

9. The resistor of claim 8, wherein:
the plurality of axially arranged zones are defined by a plurality of discrete layers, such that the first zone is a first layer, the second zone is a second layer, the third zone is a third layer, the fourth zone is a fourth layer, and the fifth zone is a fifth layer;
the first layer provides the entry fluid flow port;
the fifth layer provides the exit fluid flow port; and
the second, third and fourth layers in combination provide the internal fluid flow path.

10. The resistor of claim 9, wherein:
the first layer and the fifth layer are identically configured.

11. The resistor of claim 10, wherein:
the first layer and the fifth layer each comprise a single orifice.

12. The resistor of claim 11, wherein:
each of the single orifice is centrally located on a corresponding one of the first layer and the fifth layer.

13. The resistor of claim 11, wherein:
the second layer and the fourth layer are identically configured, with a 180-degree clocked rotational offset therebetween.

14. The resistor of claim 11, wherein:
the third layer comprises a first set of through orifices arranged in a first spiral arrangement, and a second set of through orifices arranged in a second spiral arrangement;
the first and second sets of through orifices providing the interconnecting exit and entrance orifices.

15. The resistor of claim 14, wherein:
the connecting fluid flow path between the first spiral fluid flow path and the second spiral fluid flow path is disposed proximate nearest adjacent through orifices of the first and second spiral arrangements such that a fluid shorting path may be formed by interconnecting any nearest adjacent corresponding through orifices of the first and second spiral arrangements, thereby providing for adjustability in a degree of flow resistance provided by the fluid flow resistor.

16. A fluid flow resistor comprising a first resistor according to claim 14 and a second resistor according to claim 14, wherein:
the second resistor is fluidly connected in series with the first resistor;
the first resistor defines a first stage of a multi-stage resistor and the second resistor defines a second or higher level stage of the multi-stage resistor;
the entrance and exit orifices, or the first and second sets of through orifices, of the first stage have a first common diameter; and
the entrance and exit orifices, or the first and second sets of through orifices, of the second stage have a second common diameter.

17. The resistor of claim 16, wherein:
the second common diameter is equal to the first common diameter.

18. The resistor of claim 16, wherein:
the second common diameter is not equal to the first common diameter.

19. The fluid resistor of claim 16, wherein:
the first stage has a corresponding first internal fluid flow path with a corresponding first connecting fluid flow path between the corresponding first and second spiral fluid flow paths;
the second stage has a corresponding second internal fluid flow path with a corresponding second connecting fluid flow path between the corresponding first and second spiral fluid flow paths; and
the second internal fluid flow path is shorter than the first internal fluid flow path based at least in part on placement of the corresponding second connecting fluid flow path in the second internal fluid flow path relative to placement of the corresponding first connecting fluid flow path in the first internal fluid flow path.

20. The resistor of claim 9, wherein:
each of the entrance and exit orifices have a diameter that is equal to or greater than a thickness of the third layer.

21. The resistor of claim 9, wherein:
the third layer has a thickness that is greater than a thickness of one or more of the first layer, the second layer, the fourth layer, or the fifth layer.

22. The resistor of claim 8, wherein:
the first zone and the second zone are provided by a single monolithic layer;
the second zone and the third zone are provided by a single monolithic layer;
the third zone and the fourth zone are provided by a single monolithic layer; or
the fourth zone and the fifth zone are provided by a single monolithic layer.

23. The resistor of claim 8, wherein:
the plurality of axially arranged zones are disposed relative to each other with a fluid tight seal between each adjacent zone that provides the entry fluid flow port and the exit fluid flow port with the internal fluid flow path therebetween.

24. The resistor of claim 23, wherein:
the fluid tight seal comprises one or more of: an hermetic seal; a fusion bond; a gold layer bond; a brazed bond; or, an adhesive bond.

25. The resistor of claim 1, wherein:
the body further comprises a plurality of flat discs that collectively form the body as a cylindrical body.

26. The resistor of claim 1, wherein:
the first spiral direction spirals from a cylindrical center of the body outward toward an outer cylindrical perimeter of the body, and the second spiral direction spirals from the outer cylindrical perimeter of the body toward the cylindrical center of the body.

27. The resistor of claim 1, wherein:
the first spiral direction spirals from an outer cylindrical perimeter of the body inward toward a cylindrical center of the body, and the second spiral direction spirals from the cylindrical center of the body toward the outer cylindrical perimeter of the body.

28. The resistor of claim 1, wherein:
each chamber of the plurality of discrete fluid flow chambers are identically configured.

29. The resistor of claim 1, wherein:
each chamber of the plurality of discrete fluid flow chambers are not identically configured in that one or more chambers have a longer fluid flow path between corresponding interconnecting fluid flow restriction passages than another one of the plurality of discrete fluid flow chambers.

30. The resistor of claim 1, wherein:
each of the first and second spiral directions form a spiral that is in accordance with an equation for the spiral of Archimedes.

31. The resistor of claim 1, wherein:
the first spiral direction forms a spiral defined by $(r=a+b\theta)$; and
the second spiral direction forms a spiral defined by $(r=2a+b\theta)$;
where:
a and b are user defined constants;
r is the radius at any given point on the corresponding spiral from a center of the body; and
$\theta$ is the degree of rotation of the corresponding radius.

32. A fluid flow resistor, comprising:
a flat disc-like cylindrical body comprising an entry fluid flow port and an exit fluid flow port, a plurality of orifices therein extending axially through the body and in fluid communication with the entry fluid flow port and the exit fluid flow port, and a plurality of discrete fluid flow chambers serially connecting the plurality of orifices to form a fluid flow path internal of the body, a combination of the plurality of orifices and the plurality of fluid flow chambers disposed to form a first spiral fluid flow path in a first spiral direction, and a second spiral fluid flow path in a second spiral direction opposite the first spiral direction, the first spiral fluid flow path and the second spiral fluid flow path comprising a connecting fluid flow path therebetween to provide for spiral reversal of fluid flow within the body, the first spiral fluid flow path extending from the entry fluid flow port to the connecting fluid flow path, the second spiral fluid flow path extending from the connecting fluid flow path to the exit fluid flow port.

33. The resistor of claim 32, wherein:
the entry fluid flow port is disposed on a first portion of the body;
the plurality of fluid flow chambers comprises a first set of fluid flow chambers disposed on a second portion of the body adjacent the first portion;
the plurality of orifices are disposed on a third portion of the body adjacent the second portion;
the plurality of fluid flow chambers further comprises a second set of fluid flow chambers disposed on a fourth portion of the body adjacent the third portion;
the exit fluid flow port is disposed on a fifth portion of the body adjacent the fourth portion;
the first, second, third, fourth and fifth portions are disposed relative to each other with a fluid tight seal between each adjacent portion that provides the entry fluid flow port and the exit fluid flow port with the fluid flow path internal of the body therebetween.

34. The resistor of claim 33, wherein:
a combination of the plurality of axially extending orifices and the plurality of fluid flow chambers are configured to effect reversal of a fluid flow velocity vector from one of the axially extending orifices to a serially and sequentially connected another one of the axially extending orifices.

35. The resistor of claim 34, wherein:
the combination of the first set of fluid flow chambers, the plurality of axially extending orifices, and the second set of fluid flow chambers are configured to effect reversal of the fluid flow velocity vector from one of the fluid flow chambers of the first set of fluid flow chambers to a serially and sequentially connected one of the fluid flow chambers of the second set of fluid flow chambers.

* * * * *